Oct. 4, 1966
J. H. THOMPSON ETAL
3,277,435
DECK VELOCITY ULTRASONIC HYDROPHONES
Filed Feb. 18, 1963
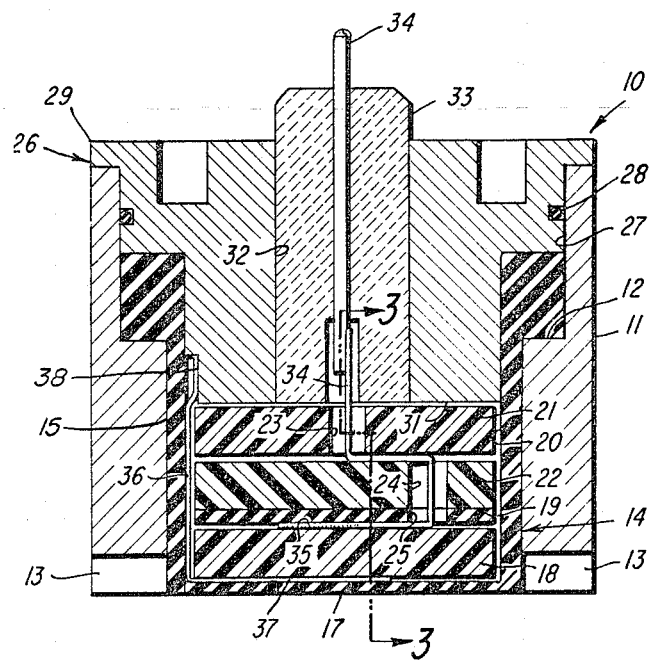
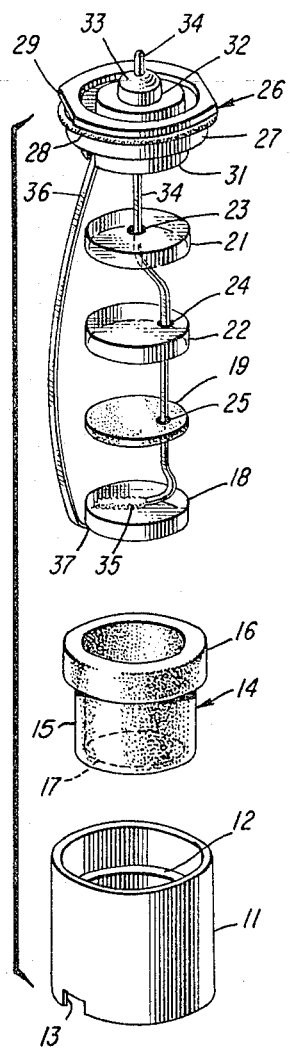
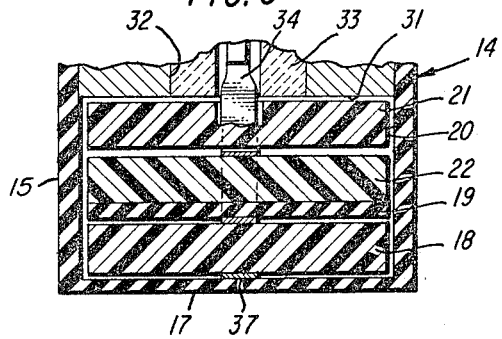
INVENTORS
John H. Thompson
Robert H. Whittaker
Robert A. Lester
BY Claude Funkhouser
ATTORNEY

United States Patent Office 3,277,435
Patented Oct. 4, 1966

3,277,435
DECK VELOCITY ULTRASONIC HYDROPHONES
John H. Thompson, Pittsburgh, Robert H. Whittaker, Export, and Robert A. Lester, Pitcairn, Pa., assignors, by mesne assignments, to the United States of America as represented by the Secretary of the Navy
Filed Feb. 18, 1963, Ser. No. 259,798
6 Claims. (Cl. 340—10)

This invention relates to an underwater transducing device and, more particularly, to a structure embodying a crystal of the barium titanate, piezoelectric ceramic type, and a new and novel manner of mounting and loading the same.

The device of the present invention is particularly adapted for applications in the frequency range from 1000 kc. to 1700 kc., and provides a hydrophone structure having increased sensitivity characteristics over prior art underwater crystal type transducers.

The hydrophone of the present invention is constructed and arranged to approach to within 3 to 4 db, the theoretical maximum sensitivity of the crystal element used therein. An improvement of 6 to 15 db being obtained with new and improved hydrophones over hydrophones using Plexiglass faces. The hydrophone utilizes the high sensitivity and broadband characteristics obtainable by the use of a lowloss material such as, for example "Rho-c" rubber faces and effective water backing while incorporating a simple pressure equalizing arrangement to permit operation at high pressures. The hydrophone unit is filled with castor oil, silicone oil or some similar type fluid possessed of the required characteristics and well-known in the art to which this invention pertains for the purpose of providing acoustic coupling and pressure equalization.

The hydrophone of the present invention differs from prior art types of hydrophones in that a high sensitivity is obtained with a smaller unit through the unique construction thereof. Furthermore, the hydrophone provides a desired need for high sensitivity which is necessary in order to operate at levels well above the leak-through driving signals. The cables or lines driving these hydrophones are often of lengths of several hundred feet. The impedance matching of transducers and the amplifiers used therewith for transmitting signals over lines of this length presents a number of problems, particularly with high frequency signal intelligence as is well-known in the art; namely, that unless a low impedance line or connecting cable is used the high frequency output of the transducer is severely attenuated by the inherent capacity effect of the line connecting the transducer with the amplifying equipment utilized therewith.

Such problems as the sensitivity problem might possibly be solved by employing preamplifiers in the transducer housing. Inasmuch as the transducers of the instant invention are intended for utilization, both as a receiving hydrophone and a transmitting hydrophone, the use of preamplifiers in the transducing housing materially complicates the system. Also, serious problems are encountered in maintaining the necessary matching of the phase characteristics of the preamplifiers utilized in such an application which would of necessity have to be matched within a fraction of a degree. The instant hydrophone is well adapted for utilization in equipment used for underwater launching of guided missiles from submarine type vessels. The size of the instant hydrophone is determined by the mounting post therefor which has a diameter adequate to withstand the hydrostatic forces to which the hydrophone is subjected while the submarine is operating at high speed, and yet small enough to minimize the turbulent flow set up by the flow of water around the hydrophone.

High frequency hydrophones have been known in the art for some time and are used primarily in therapeutic and industrial processing applications. These applications generally require transducers capable of emitting high intensity acoustic energy. Such devices are frequently constructed in one of the following ways with the piezoelectric element operating at its half-wave thickness resonant mode.

In one such application, the element is directly coupled to the medium with an effective air backing on the element. A closed air chamber may be used for this purpose. "Coprene" rubber and cork have had general use as pressure release material for air-backed operation. Also, tunable reflector plate with a fluid coupling is sometimes utilized for obtaining an effective air backing.

In another prior art type of device, the piezoelectric element is coupled to the medium through a membrane with a suitable fluid coupling having acoustic impedance characteristics similar to water. The backing may take any of the configurations of the aforementioned type. U.S. Patent 3,002,179 issued to D. W. Kuester is an example of a low frequency hydrophone which is of a construction utilizing the aforementioned arrangement.

In another type of hydrophone the piezoelectric elements are cemented to a high impedance protective covering, the thickness of which is a multiple of the half-wave length of the frequency of the desired signal intelligence. The aforementioned air backing techniques are also utilized in such hydrophones.

Still in another embodiment of the prior art hydrophones, the element is cast, cemented, or coupled by a liquid film to a low impedance protective covering. U.S. Patent 2,967,957 which was issued to F. Massa is an example of the last mentioned type of construction. In this latter type device, the thickness of the covering may or may not be a half-wave length in the thickness direction. The airbacking techniques previously mentioned are also incorporated in the design of this last mentioned device.

In attempting to obtain the performance desired from the hydrophone of the instant invention, consideration must be given to the high ambient pressures of the character of 1000 p.s.i. and greater to which the device will be subjected during use thereof. Also, the requirement for broad bandwidth presents certain problems. These and other considerations considerably complicate the solution to the problem. Any of the aforementioned prior art methods are applicable to the high ambient pressure operation when the proper backing is used. It is obvious that actual air-backing can only be used for the two latter mentioned types of construction where the high impedance covering would be epoxy, aluminum, brass, or steel and the low impedance covering would be plexiglass or polystyrene. The high impedance coverings of the prior art types are not suitable for broad band operation if a liquid coupling is used between the element and covering. Bonding or soldering of the element to the covering is an improvement. It has been found, however, that the bond between the aforesaid components can be broken in response to a moderate external force on the covering. Moreover, the use of a low impedance covering with the element bonded to the covering may be undesirable for the reason that the plastic must be of a sufficient thickness to prevent breaking the bond between the covering and the element in response to the application of external pressure.

According to certain application, for example, wherein some signal loss may be tolerated, the use of plastic encapsulation (excluding epoxy) provides a compact hydrophone element in which an effective air-backing may be obtained with the use of "Coprene" rubber or cork.

The techniques by which an effective air-backing is obtained appears to offer a simple solution such as, for example, by allowing an acoustic coupling fluid, such as castor oil, to flow freely about the piezoelectric element. For the membrane covering, the hydrostatic pressure is readily equalized about the element. For the low impedance covering, some provision must be made for pressure equalization such as, for example, a Sylphon bellows. The reflective plate as a means for obtaining an effective air-backing is useful only for narrow band operation and, hence, cannot be employed in the present deck velocity hydrophone. From the foregoing, "Coprene" and cork appear to be the best and most dependable materials to be used for backing. Heretofore, "Coprene" and similar backing materials have been employed in low frequency hydrophones, such as the 20 to 100 kc.p.s. type.

The use of "Coprene" at high frequencies, however, is limited for the reason that an oil film between the crystal element and the "Coprene" may act as a transformer matching the element to the "Coprene." It will be understood, that this is due to the fact that high acousic impedance of the element is matched to the low acoustic impedance of the "Coprene" through the $\gamma/4$ transformer action of the oil film. It will be further understood that at high frequencies a $\gamma/4$ film may be less than 0.010 inch thick.

The aforementioned problem is solved by using an acoustic backing of a sound absorbing rubber, Rho-c, for example, which has an acoustic impedance equal to that of oil. In this case the oil film thickness is not critical, but one-half of the power is dissipated in the rubber. The additional acoustic loading on the crystal element broadbands the transducer by lowering the mechanical Q of the element.

Accordingly, an object of the present invention is to provide a new and improved hydrophone particularly adapted for applications in the frequency range from 100 kc. to 1700 kc.

Another object of the invention is to provide a hydrophone having increased sensitivity characteristics over prior art underwater crystal type transducers.

Still another object of the invention is to provide a hydrophone constructed and arranged to approach to within 3 to 4 db of the theoretical maximum sensitivity of the crystal contained therein.

A further object of the invention is to provide a hydrophone which utilizes the sensitivity and broadband characteristics obtainable by the use of a low-loss material and effective water backing incorporating a simple pressure equalizing scheme to allow operation at high pressures.

A still further object of the invention is to provide an underwater transducing device wherein improved characteristics are obtained by a new and novel loading technique.

Other objects, advantages and novel features of the invention will become apparent from the following detailed description of the invention when considered in conjunction with the accompanying drawings wherein:

FIG. 1 is a central longitudinal section view of the hydrophone constructed in accordance with the present invention;

FIG. 2 is an exploded isometric view of the hydrophone of FIG. 1; and

FIG. 3 is a fragmentary sectional view taken on the line 3—3 of FIG. 1.

Referring now to the drawing and, more particularly, to FIG. 1 thereof wherein the showing is of a crystal mounting and loading structure of a preferred embodiment of the mounting arrangement thereof, the hydrophone generally indicated by the reference character 10 comprises an outer tubular member or shell 11 composed of any metallic material suitable for the purpose and provided with an internal shoulder 12 and a plurality of mounting slots 13 formed in one end thereof to facilitate mounting of the hydrophone on a suitable support.

An element indicated generally by the reference character 14 for supporting or mounting the piezoelectric ceramic crystal is disposed within the sleeve 11, the supporting element 14 being of a configuration similar to a top hat. It comprises a relatively thick cylindrical wall 15 provided with a compressible flange 16 at one end and a relatively thin diaphragm portion of the bottom or end wall 17 at the other end thereof and a centrally disposed recess 20. The aforesaid element 14 is composed preferably of rubber such as, for example, the type known in the trade as "Rho-c" rubber. It will be understood that flange or brim 16 of the top hat is in sealing engagement with the shoulder 12 on the shell 11.

A barium titanate piezoelectric ceramic element 18 is located in the element 14 in predetermined spaced relation with respect to the thin wall 17 thereof. The piezoelectric element 18 is backed by a disc 19, composed of a suitable sound absorbing rubber such as, for example, the halogenated polymers type rubber.

To complete the crystal unit a pair of discs 21 and 22 are disposed on disc 19, these discs being composed of plastic material such as, for example, cellulose derivatives and resins formed by chemical condensation or polymerization. It will be noted disc 21 is provided with a centrally disposed opening or bore 23 extending therethrough, and disc 22 is provided with an opening 24 disposed at one side thereof and extending therethrough. The opening 24 in disc 22 is in alignment with a complementary opening 25 formed in the sound absorbing disc 19, the aforesaid openings in the disc 19, 21 and 22 are utilized for establishing an external connection to the piezoelectric disc 18, as will be hereinafter more fully set forth.

The hydrophone is further provided with a base member indicated generally by the reference character 26 having a cylindrical portion 27 disposed within the upper end of the sleeve 11 and sealed thereto in any conventional manner such as, for example, by a resilient O-ring 28. The cylindrical portion 27 is provided on one end with a flange 29 in abutting and sealing engagement with the terminal end of the shell 11, the other end thereof being provided with a cylindrical nipple 31 of a diameter less than the diameter of the portion 27, and sealably engaging the wall defining the recess 20 in the element 14. The base 26 is further provided with a centrally disposed bore 32 extending therethrough and into the recess 20 in element 14 and having a glass seal 33 disposed therein. As will be noted in FIG. 1, the glass seal 33 is used to bring the metal lead 34 from the crystal 18 through the base 26, the lead 34 being connected to the crystal 18, as at 35 and passed through opening 23, 24 and 25 in discs 21, 22 and 19, respectively. Thus, by this arrangement an external connection is established to the piezoelectric ceramic disc 18. To complete the circuit connection to the disc 18, a second lead 36 is disposed within the hydrophone assembly having one end attached to the crystal 18, as at 37, the other end thereof being attached to the nipple 31 of base 26, as at 38.

It will be understood that during assembly of the hydrophone the shoulder 12 on shell 11 compresses the flange or brim 16 on the top hat element 14 to seal the whole assembly from sea water. Under pressure, the cylindrical portion 15 of element 14 compresses slightly, equalizing the pressure inside the hydrophone and thus prevents leaks through the compression seal.

From the foregoing it will be apparent that a new and improved hydrophone has been provided which requires no external bellows or equalizing system and which is readily assembled and disassembled. Also, the units are as interchangeable as the elements themselves since there are no critical dimensions upon which the performance of the elements depend. Moreover, the unique feature of the transducer is its combination of high sensitivity and ability to withstand high ambient pressure which is due largely to the rubber top hat construction which presses the flange or brim thereof against the rubber-ring seal with a pressure which is a direct function of the ambient pressure and concurrently therewith compresses the cylindrical portion of the top hat so that the pressure on both faces of the crystal element remains the same.

Obviously, many modifications and variations of the present invention are possible in the light of the above teachings. It is therefore to be understood that within the scope of the appended claims the invention may be practiced otherwise than as specifically described.

What is claimed is:

1. An underwater transducer characterized by high sensitivity comprising
    crystal supporting means composed of pliable material and having a centrally disposed recess filled with a viscous fluid,
    pressure responsive means formed with and disposed on one end of said supporting means,
    a ceramic crystal element disposed in said recess in intimate spaced relation with respect to said pressure responsive means,
    means composed of sound absorbing material disposed within said recess for covering one surface of the crystal element,
    means composed of plastic material disposed in the recess in engagement with said covering means,
    base means supported on the supporting means,
    tubular means enclosing the supporting means and fitted onto said base means for compressing the supporting means an amount sufficient to seal the transducer assembly, and
    a pair of electrical leads connected to the crystal element for establishing an electrical connection between the crystal element and the exterior of the base means.

2. An underwater transducer according to claim 1 wherein
    said crystal supporting means includes a cylindrical portion provided with a compressible flange on one end and an integrally formed diaphragm portion on the other end thereof.

3. An underwater transducer according to claim 1 wherein
    said base means includes a cylindrical element snugly engaging and locked to said tubular means,
    a flange member in sealing engagement with the tubular means, and
    a nipple disposed within and snugly engaging the wall defining said recess.

4. An underwater transducer according to claim 1 wherein
    said tubular means includes a cylindrical portion and a shoulder disposed within the interior thereof in sealing engagement with the supporting means, and with one end thereof in sealing engagement with the base means.

5. A highly sensitive underwater hydrophone of the character described comprising
    a cylindrical container similar to configuration to a top-hat and composed of a compressible material,
    a barium titanate ceramic element disposed within said cylindrical container,
    a disc composed of sound absorbing material disposed within said container and providing a backing for the ceramic element,
    a pair of disc elements disposed within the container and located above the disc,
    a pair of leads connected to the ceramic element,
    a base member composed of metallic material and having a portion thereof disposed within the container,
    a glass seal carried by said base member supporting one lead of said pair of leads connected to the ceramic element to provide an external electrical connection thereto,
    means for connecting the other lead of said pair of leads to the base member,
    pressure responsive diaphragm means integrally formed as the outer end portion of the container and disposed in intimate spaced relationship with the ceramic element, and
    a viscous fluid disposed within said container for providing an acoustic coupling and pressure equalization.

6. A highly sensitive underwater hydrophone of the character described comprising
    a cylindrical container composed of a compressible material and having a centrally disposed recess formed therein,
    a barium titanate crystal disposed within said recess,
    a disc composed of sound absorbing rubber disposed within the recess and providing a water backing to permit operation at high pressures,
    disc means disposed within said recess and backing said disc of sound absorbing material,
    means for establishing an electrical connection to the crystal,
    means including a shell engageable with said compressible container for providing a water-tight seal therebetween,
    a diaphragm portion integrally formed with the container and disposed in intimate spaced relation with respect to the crystal, and
    a quantity of oil disposed within said recess for providing acoustic coupling and pressure equalization.

References Cited by the Examiner

UNITED STATES PATENTS

| | | | |
|---|---|---|---|
| 2,967,957 | 1/1961 | Massa | 340—10 |
| 2,977,572 | 3/1961 | Pope | 340—8 |
| 3,079,584 | 2/1963 | Sims | 340—10 |

CHESTER L. JUSTUS, *Primary Examiner.*

J. P. MORRIS, *Assistant Examiner.*